(12) United States Patent
Ranganathan et al.

(10) Patent No.: US 12,387,058 B2
(45) Date of Patent: Aug. 12, 2025

(54) SYSTEMS AND METHODS FOR REDUCING INPUT TO AND INCREASING PROCESSING SPEEDS OF NATURAL LANGUAGE PROCESSING MODELS

(71) Applicant: Verizon Patent and Licensing Inc., Basking Ridge, NJ (US)

(72) Inventors: Prakash Ranganathan, Gingee (IN); Miruna Jayakrishnasamy, Vellore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/758,444

(22) Filed: Jun. 28, 2024

(65) Prior Publication Data

US 2024/0354518 A1    Oct. 24, 2024

Related U.S. Application Data

(63) Continuation of application No. 17/752,230, filed on May 24, 2022, now Pat. No. 12,050,879.

(51) Int. Cl.
| | |
|---|---|
| *G06F 40/30* | (2020.01) |
| *G06F 40/226* | (2020.01) |
| *G06F 40/284* | (2020.01) |
| *G06F 40/40* | (2020.01) |

(52) U.S. Cl.
CPC ............ *G06F 40/40* (2020.01); *G06F 40/226* (2020.01); *G06F 40/284* (2020.01); *G06F 40/30* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 9,135,242 B1* | 9/2015 | Wang | G06F 40/30 |
| 9,336,192 B1* | 5/2016 | Barba | G06F 40/284 |
| 9,767,165 B1* | 9/2017 | Tacchi | G06F 16/9535 |
| 11,379,538 B1* | 7/2022 | McClusky | G06F 16/93 |
| 11,620,320 B1* | 4/2023 | Shukla | G06F 40/30 707/692 |
| 2008/0189269 A1* | 8/2008 | Olsen | G06F 16/951 707/999.005 |
| 2009/0193011 A1* | 7/2009 | Blair-Goldensohn | G06F 16/345 707/999.005 |
| 2011/0106807 A1* | 5/2011 | Srihari | G06F 16/288 707/E17.046 |

(Continued)

*Primary Examiner* — Lamont M Spooner

(57) ABSTRACT

A device may generate first scores for sentences of text based on a cumulative frequency of words in each sentence, may generate second scores for the sentences based on a cumulative frequency of domain entities in each sentence, and may generate third scores for the sentences based on a sentiment analysis of each sentence. The device may generate a summary of the text, may filter the sentences to extract a first set of sentences, may filter the sentences to extract a second set of sentences, and may filter the sentences to extract a third set of sentences. The device may identify and assign weights to a first group of sentences, a second group of sentences, and a third group of sentences, may generate a ranked list of sentences based on the weighted first group, second group, and third group, and may perform actions based on the final summary.

20 Claims, 12 Drawing Sheets

(56) References Cited

U.S. PATENT DOCUMENTS

| | | | | |
|---|---|---|---|---|
| 2011/0209043 | A1* | 8/2011 | Guo | G06F 40/30 |
| | | | | 715/230 |
| 2011/0251977 | A1* | 10/2011 | Cialowicz | G06F 16/313 |
| | | | | 705/342 |
| 2013/0311485 | A1* | 11/2013 | Khan | G06F 16/335 |
| | | | | 707/758 |
| 2015/0339288 | A1* | 11/2015 | Baker | G06F 40/166 |
| | | | | 704/9 |
| 2018/0113855 | A1* | 4/2018 | Bostick | G06F 40/205 |
| 2018/0121539 | A1* | 5/2018 | Ciulla | G06F 16/3344 |
| 2018/0336507 | A1* | 11/2018 | Torrado | G06N 20/00 |
| 2019/0121852 | A1* | 4/2019 | Applegate | H04L 12/1831 |
| 2019/0129920 | A1* | 5/2019 | Bainer | G06F 40/30 |
| 2019/0179903 | A1* | 6/2019 | Terry | G06N 3/004 |
| 2019/0180195 | A1* | 6/2019 | Terry | G06F 40/295 |
| 2019/0279101 | A1* | 9/2019 | Habti | G06F 9/541 |
| 2019/0332666 | A1* | 10/2019 | Dadachev | G06F 40/284 |
| 2020/0034433 | A1* | 1/2020 | Cassidy | G06F 21/32 |
| 2020/0090059 | A1* | 3/2020 | Kim | G06Q 50/18 |
| 2020/0210490 | A1* | 7/2020 | Hutchins | G06V 30/412 |
| 2020/0210521 | A1* | 7/2020 | Hutchins | G06F 40/221 |
| 2020/0311344 | A1* | 10/2020 | Tripathi | G06F 16/24575 |
| 2021/0110113 | A1* | 4/2021 | Brousseau | G06F 40/55 |
| 2022/0253605 | A1* | 8/2022 | Tan | G06Q 10/1095 |
| 2022/0254348 | A1* | 8/2022 | Tay | G06F 16/345 |
| 2023/0112589 | A1* | 4/2023 | Kanagovi | G06N 3/08 |
| | | | | 707/739 |
| 2023/0116515 | A1* | 4/2023 | Kanagovi | G06F 40/295 |
| | | | | 704/9 |

* cited by examiner

SYSTEMS AND METHODS FOR REDUCING INPUT TO AND INCREASING PROCESSING SPEEDS OF NATURAL LANGUAGE PROCESSING MODELS

RELATED APPLICATION

This application is a continuation of U.S. patent application Ser. No. 17/752,230, entitled "SYSTEMS AND METHODS FOR REDUCING INPUT TO AND INCREASING PROCESSING SPEEDS OF NATURAL LANGUAGE PROCESSING MODELS," filed May 24, 2022, which is incorporated herein by reference in its entirety.

BACKGROUND

Natural language processing (NLP) is a subfield of linguistics, computer science, and artificial intelligence concerned with interactions between computers and human language. In particular, NLP includes processing and analyzing large quantities of natural language data with a goal of understanding content of documents, including contextual nuances of languages within the documents. NLP may extract information and insights contained in the documents, as well as categorize and organize the documents.

DETAILED DESCRIPTION OF EXAMPLE EMBODIMENTS

Figure 1A:
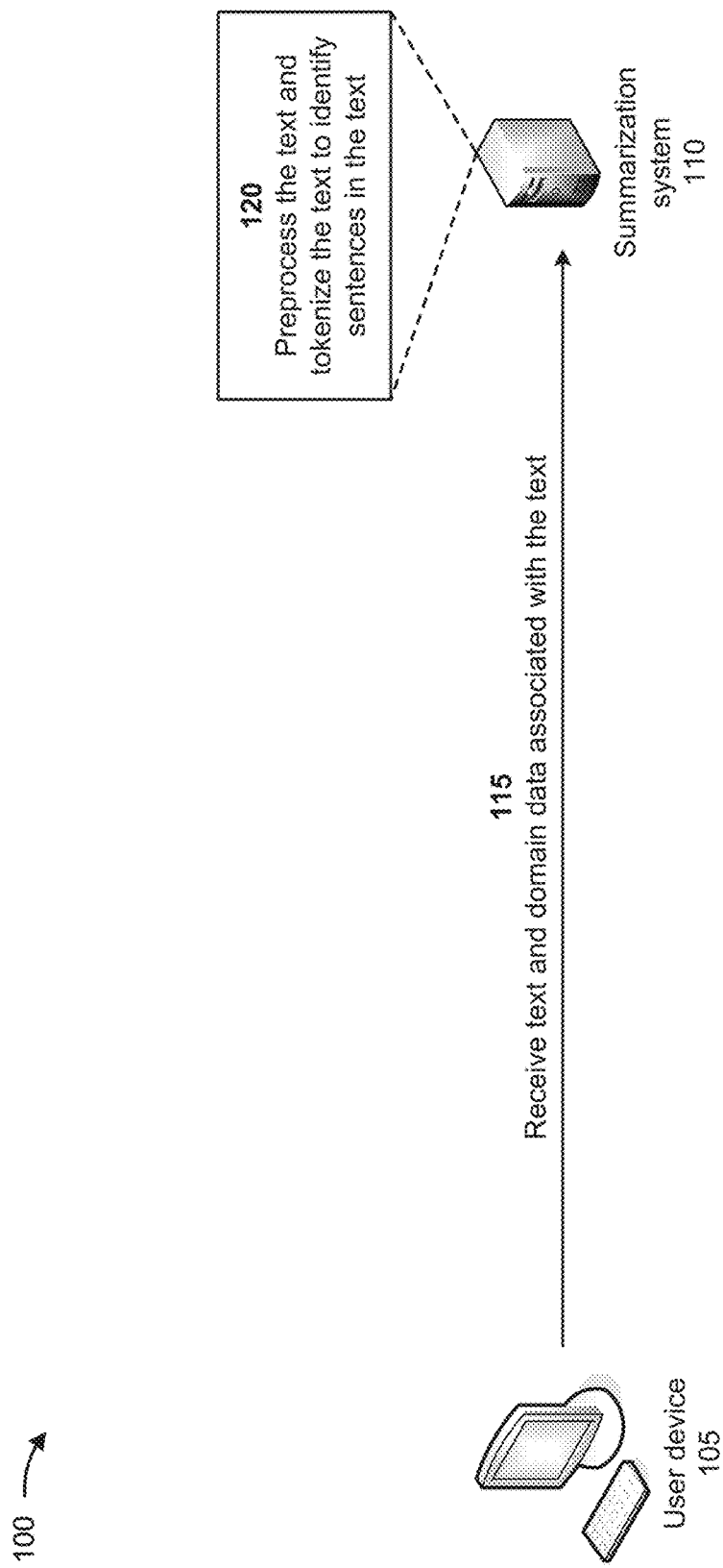
FIGS. 1A-1G are diagrams of an example associated with reducing input to and increasing processing speeds of NLP models.

The following detailed description of example implementations refers to the accompanying drawings. The same reference numbers in different drawings may identify the same or similar elements.

One challenge of NLP is dimensionality, especially when processing documents in real time. Dimensionality means that text from documents includes additional words and/or sentences that are not necessary to understand a context of the text. However, NLP still processes the additional words and/or sentences, which results in unnecessary computational overload, reduced accuracy, ambiguity, increased carbon emission, failure to process documents in real time, and/or the like. For example, user interactions with respect to products may include sharing opinions on products that the users have purchased. An effective multi-document summarization of user reviews, chats, calls, and other kinds of evaluative text containing opinions and preferences is an ever-growing area of NLP. However, due to dimensionality, NLP-generated summary text may contain words and/or sentences not related to a context of the summary text. Thus, current NLP products consume computing resources (e.g., processing resources, memory resources, communication resources, and/or the like), networking resources, and/or other resources associated with handling computational overload due to high dimensionality (e.g., or greater than a dimensionality threshold), generating less accurate summary text due to high dimensionality, generating ambiguous summary text due to high dimensionality, increasing carbon emissions due to high dimensionality, and/or the like.

Some implementations described herein provide a summarization system that reduces input to and increases processing speeds of NLP models (e.g., in real time). For example, the summarization system may receive text with sentences and domain data associated with the text, and may generate first scores for the sentences based on a cumulative frequency of words in each sentence. The summarization system may generate second scores for the sentences based on a cumulative frequency of domain entities in the domain data and in each sentence, and may generate third scores for the sentences based on a sentiment analysis of each sentence. The summarization system may process the text, with a model, to generate a summary of the text, and may determine products of the first scores and the second scores. The summarization system may filter the sentences based on non-zero products and to extract a first set of sentences, and may filter the sentences based on non-zero third scores and to extract a second set of sentences. The summarization system may filter the sentences based on a similarity with the summary and to extract a third set of sentences, and may identify a first group of sentences included in the first set, the second set, and the third set. The summarization system may identify a second group of sentences included in the first set and the third set, and may assign a first weight to the first group to generate a weighted first group, and a second weight to the second group to generate a weighted second group. The summarization system may identify a third group of sentences included in the first set and not included in the weighted first group or the weighted second group, and may assign a third weight to the third group to generate a weighted third group. The summarization system may sort the sentences in the weighted first group, the weighted second group, and the weighted third group to generate a ranked list of sentences, may generate a final summary based on the ranked list, and may perform one or more actions based on the final summary.

In this way, the summarization system reduces input to and increases processing speeds of NLP models. For example, the summarization system may generate a text summary that combines sentiment, domain knowledge associated with entities, word frequency, and an abstract summary associated with the text. The summarization system may examine the text, based on the sentiment, the domain knowledge, the word frequency, and the abstract summary associated with the text, to capture knowledge of the text in a reduced (e.g., a summarized) form. The summarization system may identify and retain sentences of the text associated with strong sentiment aspects, and may retain sentences of the text that include the domain knowledge. The summarization system may generate the abstract summary in order to identify an objective of the text. Thus, the summarization system may conserve computing resources, networking resources, and/or other resources that would have otherwise been consumed by handling computational overload due to high dimensionality, generating less accurate summary text due to high dimensionality, generating ambiguous summary text due to high dimensionality, increasing carbon emissions due to high dimensionality, and/or the like.

FIGS. 1A-1G are diagrams of an example 100 associated with reducing input to and increasing processing speeds of NLP models. As shown in FIGS. 1A-1G, example 100 includes a user device 105 associated with a summarization system 110. Further details of the user device 105 and the summarization system 110 are provided elsewhere herein.

As shown in FIG. 1A, and by reference number 115, the summarization system 110 may receive text and domain data associated with the text. For example, the summarization system 110 may receive the text from the user device 105 in a textual format, an audio format, a video format, and/or the like. If the text is received in an audio format or a video format, the summarization system 110 may convert the audio or video format to a textual format. In one example use case, the text may include text received during a bot chat session or a bot telephone call that is to be transferred to a call center employee. The summarization system 110 may receive the domain data from the user device 105 and/or from a secondary source. The domain data may include data identifying one or more domain entities (e.g., companies, agencies, products, services, offers, reviews, chats, calls, refunds, payments, cancellations, and/or the like) associated with the text.

As further shown in FIG. 1A, and by reference number 120, the summarization system 110 may preprocess the text and tokenize the text to identify sentences in the text. For example, the summarization system 110 may preprocess the text by applying one or more data cleansing techniques to the text. A data cleansing technique may remove and/or modify one or more particular words (e.g., common words such as "a," "the," and/or the like) from the text to generate clean text. In some implementations, when preprocessing the text, with the data cleansing technique, the summarization system 110 may remove duplicate data from the text, may convert incorrectly formatted data of the text into correct formats, may combine date and time data of the text, and/or the like, to generate the clean text. In some implementations, the data cleansing technique may detect and correct (or remove) corrupt or inaccurate data in the text, and may replace, modify, or delete the corrupt or inaccurate data. The data cleansing technique may detect and correct inconsistencies in the text caused by corruption in transmission or storage, caused by utilization of different definitions for similar data in different data structures, and/or the like. The data cleansing technique may remove typographical errors from the text or may validate and correct values against a known list of values. The data cleansing technique may clean the text by cross checking the text with validated text, standardizing the text by changing a reference data set to a new standard, and/or the like. Additionally, the data cleansing technique may include data enhancement, where the text is made more complete by adding related information to the text.

The summarization system 110 may tokenize the clean text to identify sentences in the clean text. In some implementations, the summarization system 110 may tokenize the text using a tokenization technique. For example, the summarization system 110 may generate various sequences of characters from the text. The summarization system 110 may generate a set of multiple terms from a multi-term phrase, may contract a phrase to an acronym (or may expand an acronym), may classify text as a particular type of text and may remove a symbol from the text that indicates the classification of the text (e.g., may classify "$1.00" as a dollar amount and may tokenize "$1.00" to "1"), may remove particular terms and/or phrases from the text (e.g., may remove ", Inc." or "Company" from text that includes an organization's name), and/or the like. This may reduce a size of the text, thereby conserving memory resources, processing resources, and/or the like associated with the summarization system 110.

Figure 1B:
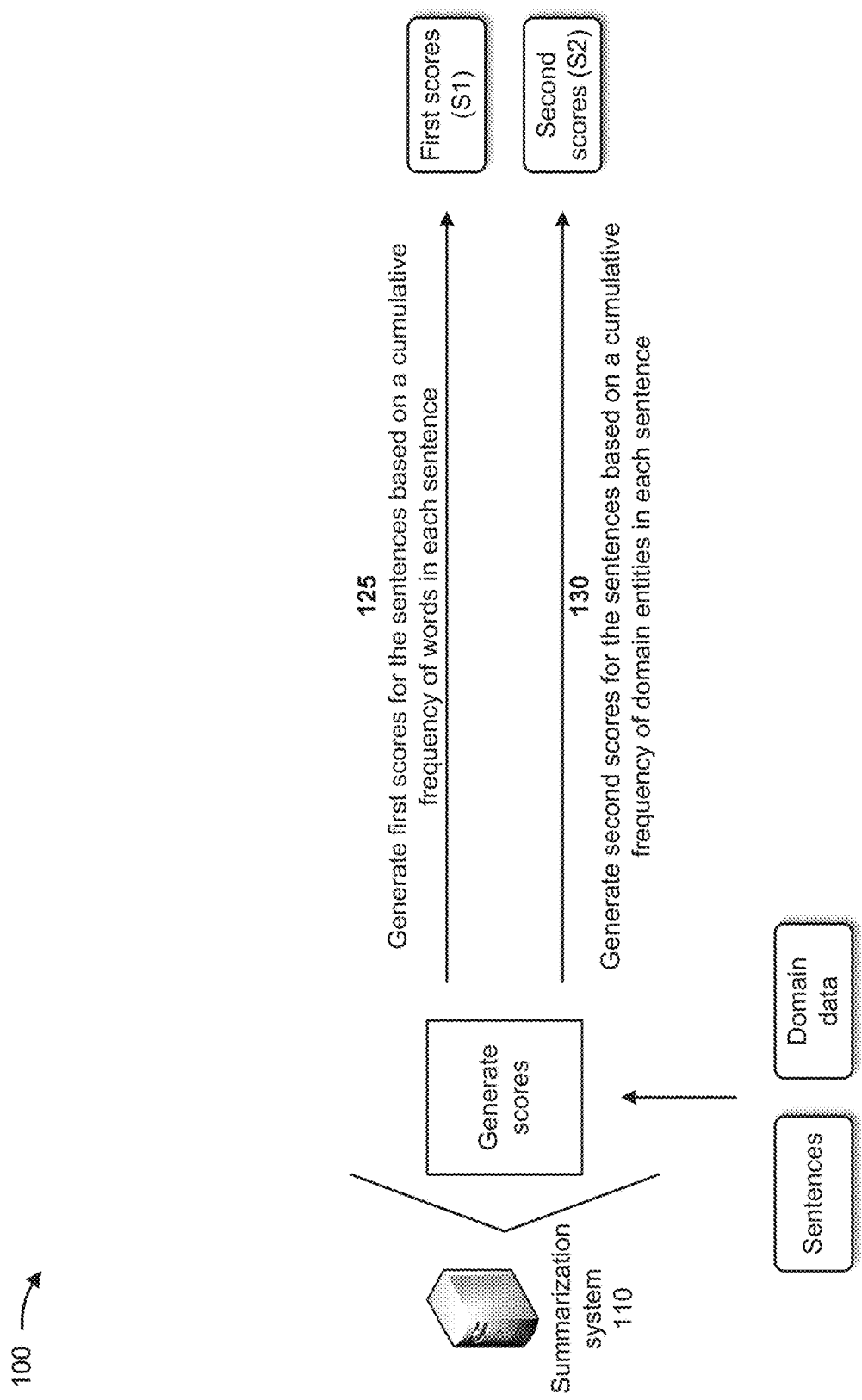

As shown in FIG. 1B, and by reference number 125, the summarization system 110 may generate first scores (S1) for the sentences based on a cumulative frequency of words in each sentence. For example, the summarization system 110 may identify words in each of the sentences and may calculate a cumulative frequency of the words identified in each of the sentences. The summarization system 110 may generate a first score for each of the sentences based on the cumulative frequency of words identified in each of the sentences. In some implementations, when generating the first scores for the sentences based on the cumulative frequency of the words in each sentence, the summarization system 110 may normalize the cumulative frequency of the words in each sentence to generate the first scores for the sentences.

As further shown in FIG. 1B, and by reference number 130, the summarization system 110 may generate second scores (S2) for the sentences based on a cumulative frequency of domain entities (e.g., identified in the domain data) in each sentence. For example, the summarization system 110 may identify domain entities in each of the sentences and may calculate a cumulative frequency of the domain entities identified in each of the sentences. The summarization system 110 may generate a second score for each of the sentences based on the cumulative frequency of domain entities identified in each of the sentences. In some implementations, when generating the second scores for the sentences based on the cumulative frequency of the domain entities in each sentence, the summarization system 110 may normalize the cumulative frequency of the domain entities in each sentence to generate the second scores for the sentences.

Figure 1C:
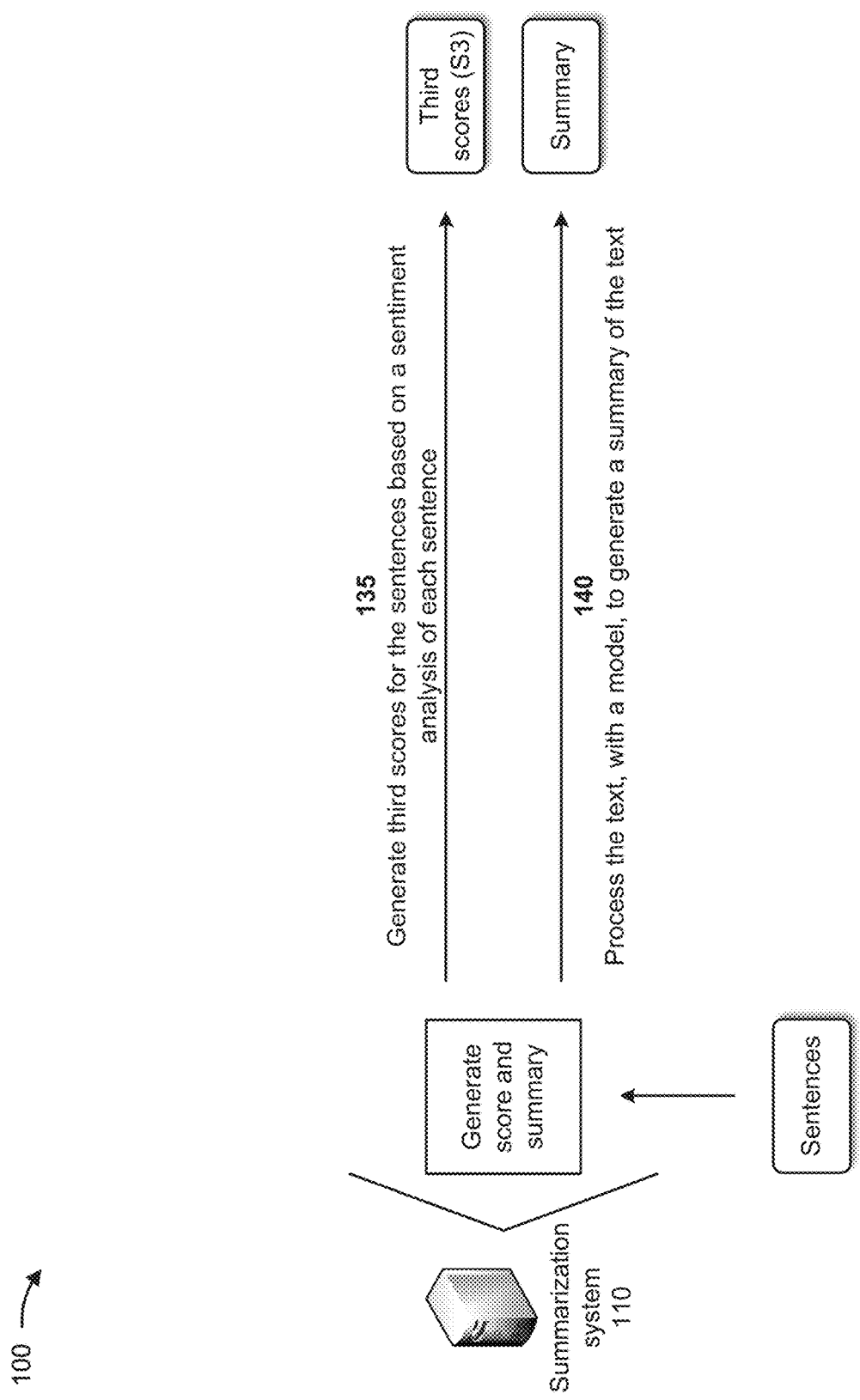

As shown in FIG. 1C, and by reference number 135, the summarization system 110 may generate third scores (S3) for the sentences based on a sentiment analysis of each sentence. For example, the summarization system 110 may extract phrases from the sentences, and may determine sentiments associated with the phrases. The summarization system 110 may generate the third scores for the sentences based on the sentiments associated with the phrases. In some implementations, the summarization system 110 may increment frequencies for phrases with zero sentiments, and may normalize final frequencies (e.g., by calculating 1−(final frequency/total quantity of phrases)) to generate the third scores for the sentences. In some implementations, the summarization system 110 may generate the third scores for the sentences based on the following sentiment analysis of each sentence (e.g., where ct is a counter, K is frequency, and N is a quantity of phrases):

```
ct=1
Score=[ ]
for each sentence D:
    K=3     {N<5}
    K=5     {N<30 and N>5}
    K=10    {N>30}
    startindex=0
    endindex=K
    Iterate below step N/K Times:
        If startindex=0:
            sentiment (D[startindex to endindex]) is zero -> ct=ct+1
        Else:
            sentiment (D[startindex-1 to endindex]) is zero -> ct=ct+1
        Endindex=startindex+K    {endindex<(startindex+K)<N}
        Endindex=N               {endindex<=(startindex+K)>=N}
```

-continued

```
If all N/K parts are neutral then
    Score.append(0.0)
Else Score.append(1−(ct/N))
Return Score.
```

As further shown in FIG. 1C, and by reference number 140, the summarization system 110 may process the text, with a model (e.g., a machine learning model, a skipping text model, and/or the like), to generate a summary of the text. For example, the summarization system 110 may utilize a machine learning model (e.g., an encoder-decoder with a beam three width) to process the text and generate the summary of the text. The summary of the text may identify an objective of the text and may include vocabulary (e.g., one or more words) not included in the text. The machine learning model may process the text to identify sentences in the text associated with the objective of the text and may weight the identified sentences so that identified sentences are retained in the summary of the text. The vocabulary included in the summary, but not included in the text, may aid in identifying the objective of the text.

Figure 1D:
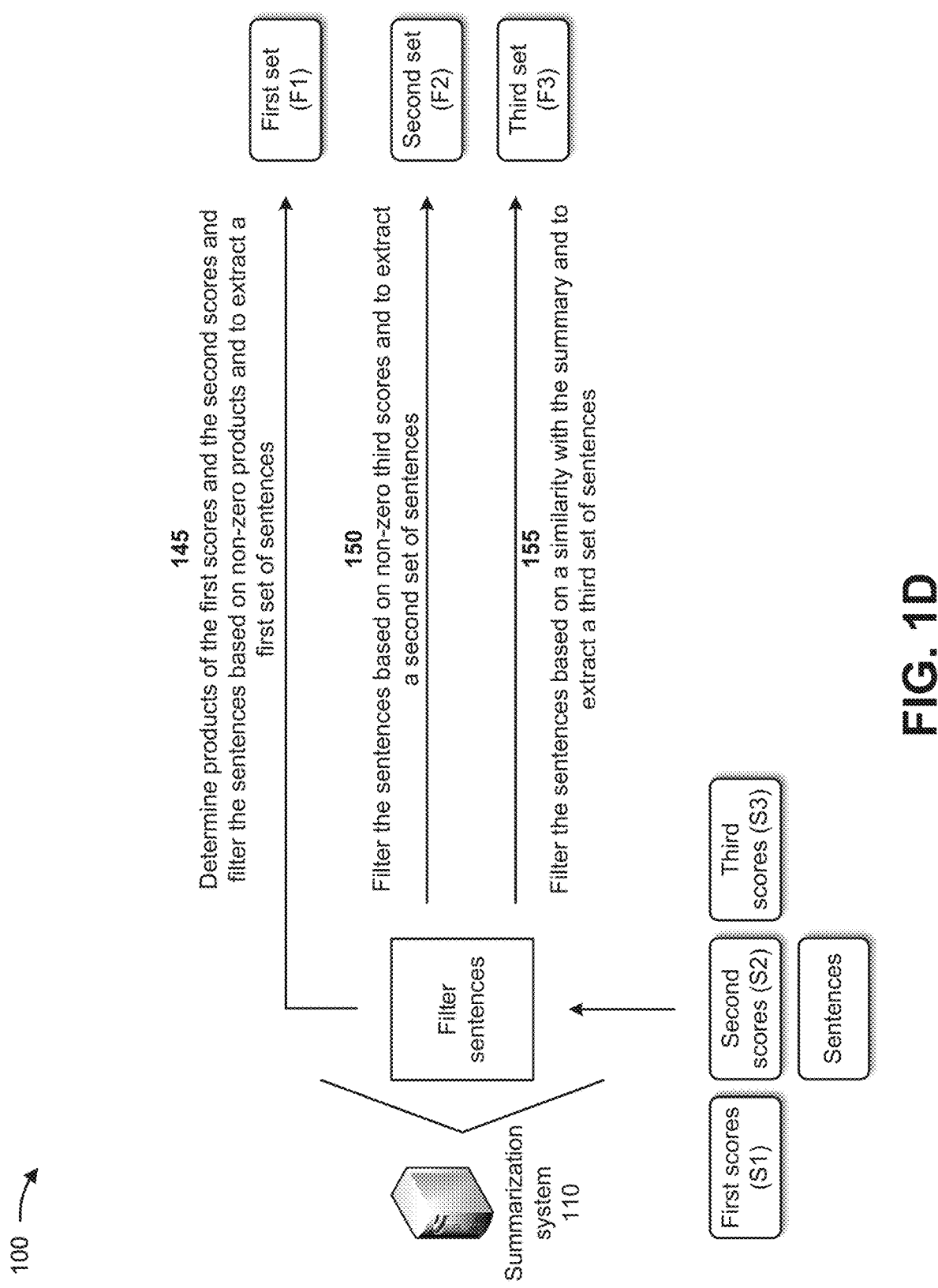

As shown in FIG. 1D, and by reference number 145, the summarization system 110 may determine perform an operation with the first scores and the second scores (e.g., calculate products of the first scores and the second scores) and may filter the sentences based on non-zero products and to extract a first set (F1) of sentences. For example, the summarization system 110 may multiply the first scores and corresponding second scores to determine the products of the first scores and the second scores. In some implementations, the summarization system 110 may multiply a first score and a second score associated with a first sentence to determine a first product, may multiply a first score and a second score associated with a second sentence to determine a second product, and/or the like. This process may continue until the corresponding first and second scores for all of the sentences are multiplied together.

The summarization system 110 may identify sentences associated with non-zero products of the first scores and the second scores, and may filter out the identified sentences into the first set of sentences. In some implementations, the summarization system 110 may sort the first set of sentences based on the products associated with the first set of sentences. For example, a sentence with a greatest product may be listed first in the first set of sentences, a sentence with a next greatest product may be listed second in the first set of sentences, and/or the like. Since the first scores relate to the cumulative frequency of words in each sentence and the second scores relate to the cumulative frequency of domain entities in each sentence, a greater product of the first scores and the second scores may indicate that corresponding sentences are preferable since they include more frequent words and domain entities.

As further shown in FIG. 1D, and by reference number 150, the summarization system 110 may filter the sentences based on non-zero third scores and to extract a second set (F2) of sentences. For example, the summarization system 110 may identify sentences associated with non-zero third scores, and may filter out the identified sentences into the second set of sentences. In some implementations, the summarization system 110 may sort the second set of sentences based on the third scores associated with the second set of sentences. For example, a sentence with a greatest third score may be listed first in the second set of sentences, a sentence with a next greatest third score may be listed second in the second set of sentences, and/or the like.

As further shown in FIG. 1D, and by reference number 155, the summarization system 110 may filter the sentences based on a similarity with the summary and to extract a third set (F3) of sentences. For example, the summarization system 110 may identify sentences that include keywords (or words similar to the keywords other than domain entities) included in the summary of the text, and may filter out the identified sentences into the third set of sentences. In some implementations, the summarization system 110 may sort the third set of sentences based on a quantity of summary keywords included in the third set of sentences. For example, a sentence with the greatest quantity of summary keywords may be listed first in the third set of sentences, a sentence with a next greatest quantity of summary keywords may be listed second in the third set of sentences, and/or the like.

Figure 1E:
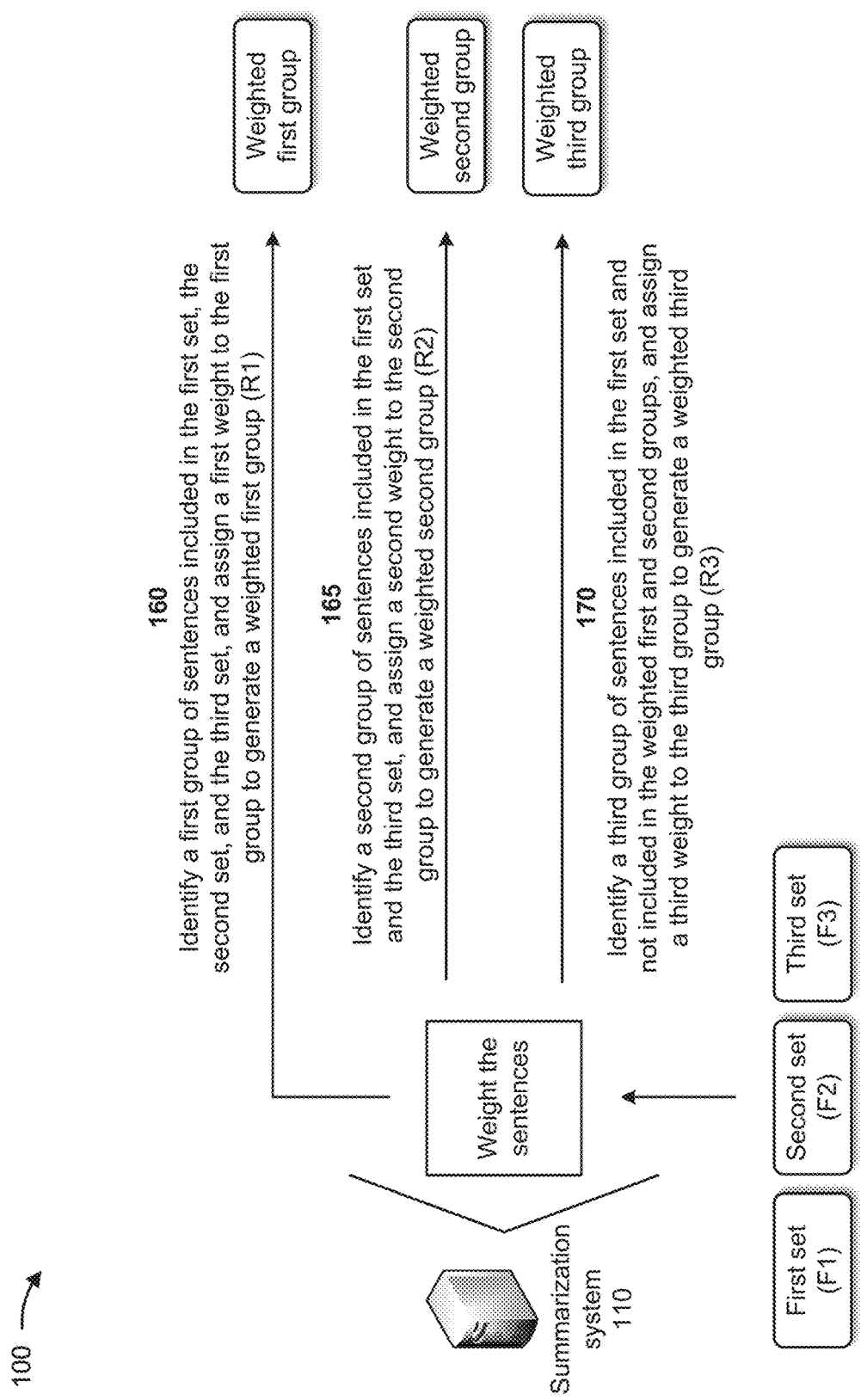

As shown in FIG. 1E, and by reference number 160, the summarization system 110 may identify a first group of sentences included in the first set, the second set, and the third set, and may assign a first weight to the first group to generate a weighted first group of sentences (R1). For example, the summarization system 110 may identify sentences included in the first set of sentences, the second set of sentences, and the third set of sentences, and may group the identified sentences into the first group of sentences. The summarization system 110 may assign the first weight to the first group of sentences to generate the weighted first group of sentences. In some implementations, the first weight may include a value (e.g., 0.8, 0.9, and/or the like) that provides a high weight to the weighted first group of sentences.

As further shown in FIG. 1E, and by reference number 165, the summarization system 110 may identify a second group of sentences included in the first set and the third set, and may assign a second weight to the second group to generate a weighted second group of sentences (R2). For example, the summarization system 110 may identify sentences included in the first set of sentences and the third set of sentences, and may group the identified sentences into the second group of sentences. The summarization system 110 may assign the second weight to the second group of sentences to generate the weighted second group of sentences. In some implementations, the second weight may include a value (e.g., 0.5, 0.6, and/or the like) that is less than the first weight and that provides a less high weight to the weighted second group of sentences than provided to the weighted first group of sentences.

As further shown in FIG. 1E, and by reference number 170, the summarization system 110 may identify a third group of sentences included in the first set and not included in the weighted first group or the weighted second group, and may assign a third weight to the third group to generate a weighted third group of sentences (R3). For example, the summarization system 110 may identify sentences included in the first set of sentences and not included in the weighted first group of sentences or the weighted second group of sentences, and may group the identified sentences into the third group of sentences. The summarization system 110 may assign the third weight to the third group of sentences to generate the weighted third group of sentences. In some implementations, the third weight may include a value (e.g., 0.2, 0.3, and/or the like) that is less than the second weight and that provides a less high weight to the weighted third group of sentences than provided to the weighted second group of sentences. In this way, the summarization system 110 may account for sentences that include more frequent words and domain entities.

Figure 1F:
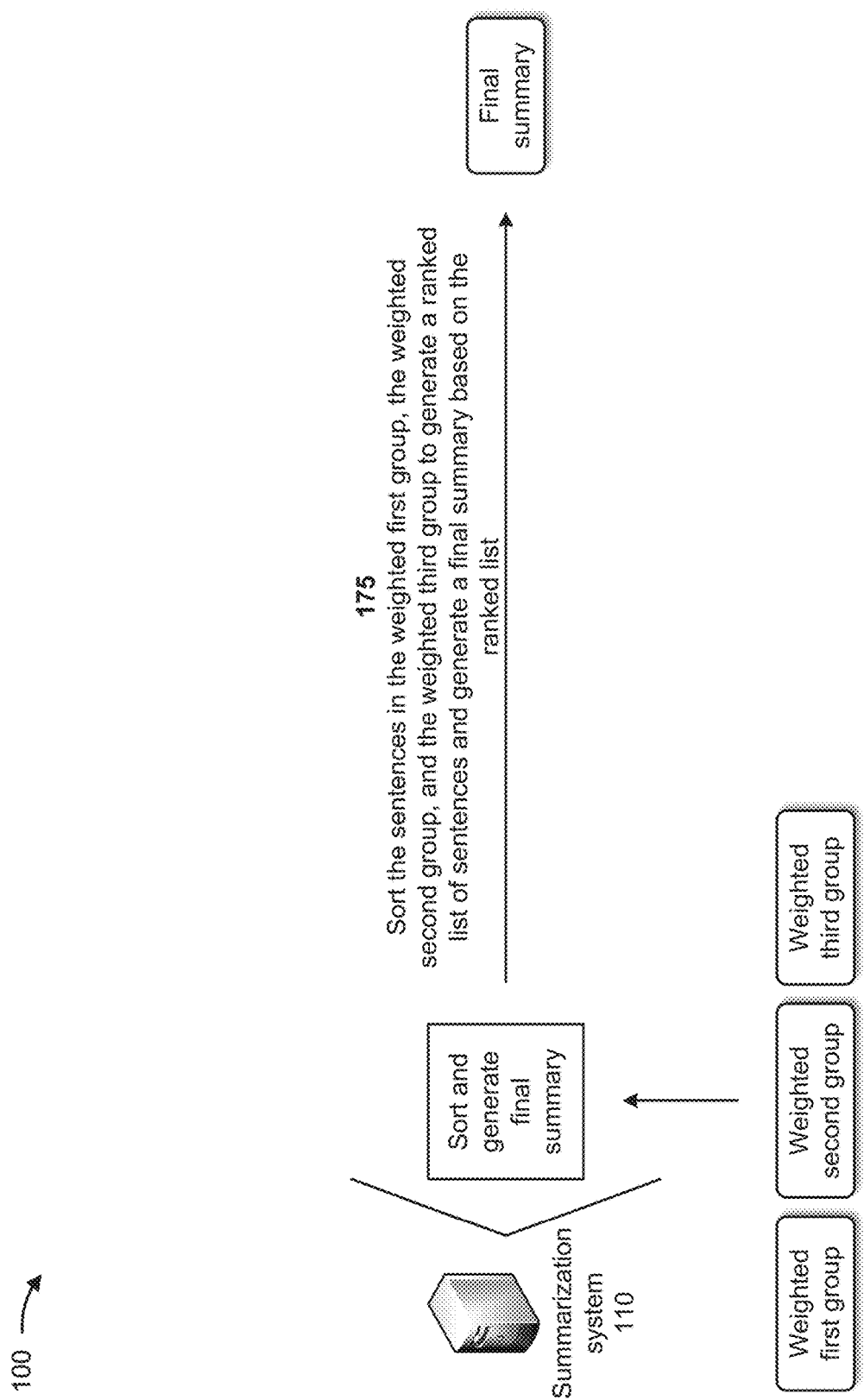

As shown in FIG. 1F, and by reference number 175, the summarization system 110 may sort the sentences in the weighted first group, the weighted second group, and the weighted third group to generate a ranked list of sentences, and may generate a final summary based on the ranked list. For example, the summarization system 110 may generate a list that includes the weighted first group of sentences, the weighted second group of sentences, and the weighted third group of sentences, and may sort the list of sentences, based on the weights assigned to the weighted first group of sentences, the weighted second group of sentences, and the weighted third group of sentences, to generate the ranked list of sentences. Based on the assigned weights, the weighted first group of sentences may be listed first in the ranked list, the weighted second group of sentences may be listed after the weighted first group of sentences in the ranked list, and the weighted third group of sentences may be listed after the weighted second group of sentences in the ranked list.

The summarization system 110 may generate the final summary based on the ranked list and based on a maximum length of text to be included in the final summary. For example, the summarization system 110 may calculate a quantity of sentences to be included in the final summary based on the maximum length of the text to be included in the final summary. The summarization system 110 may select the quantity of sentences from the ranked list of sentences based on the rankings provided to the sentences in the ranked list. For example, the summarization system 110 may select, for the final summary, the top-ranked quantity of sentences included in the ranked list.

Figure 1G:
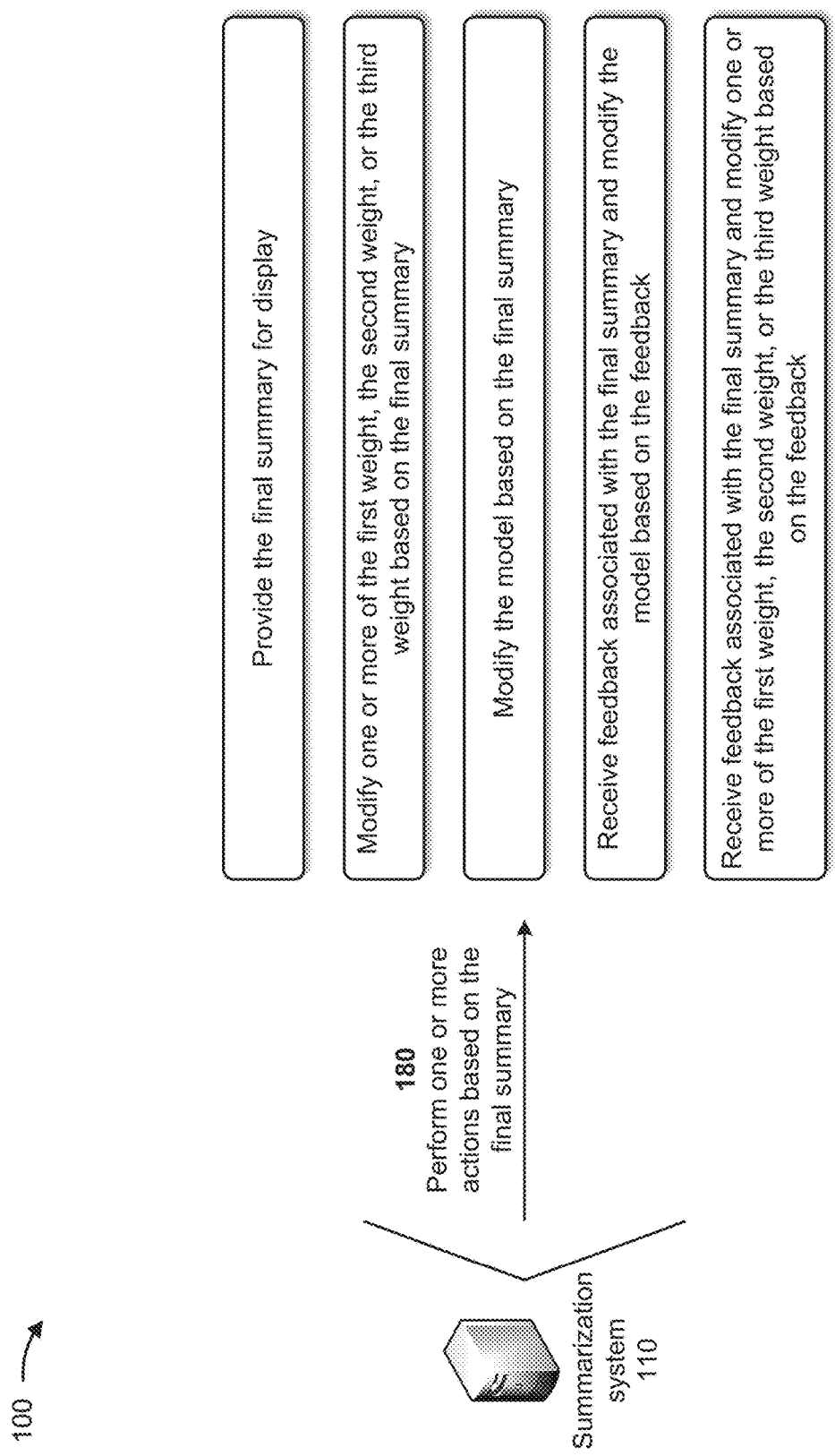

As shown in FIG. 1G, and by reference number 180, the summarization system 110 may perform one or more actions based on the final summary. In some implementations, performing the one or more actions includes the summarization system 110 providing the final summary for display. For example, the summarization system 110 may provide the final summary to the user device 105 and the user device 105 may display the final summary to a user of the user device 105 (e.g., a call center employee). In this way, the summarization system 110 may conserve computing resources, networking resources, and/or other resources that would have otherwise been consumed by generating less accurate summary text due to high dimensionality, generating ambiguous summary text due to high dimensionality, and/or the like.

In some implementations, performing the one or more actions includes the summarization system 110 modifying one or more of the first weight, the second weight, or the third weight based on the final summary. For example, the summarization system 110 may analyze the final summary and the text to determine a similarity between the final summary and the initial text. The summarization system 110 may modify one or more of the first weight, the second weight, or the third weight based on the similarity (or lack thereof) between the final summary and the initial text so that an improved final summary is generated. In this way, the summarization system 110 may conserve computing resources, networking resources, and/or other resources that would have otherwise been consumed by generating less accurate summary text due to high dimensionality, generating ambiguous summary text due to high dimensionality, and/or the like.

In some implementations, performing the one or more actions includes the summarization system 110 modifying the model based on the final summary. For example, the summarization system 110 may analyze the final summary and the initial text to determine a similarity between the final summary and the initial text. The summarization system 110 may modify the model based on the similarity (or lack thereof) between the final summary and the initial text so that an improved final summary is generated. In this way, the summarization system 110 may conserve computing resources, networking resources, and/or other resources that would have otherwise been consumed by handling computational overload due to high dimensionality, generating ambiguous summary text due to high dimensionality, increasing carbon emissions due to high dimensionality, and/or the like.

In some implementations, performing the one or more actions includes the summarization system 110 receiving feedback associated with the final summary and modifying the model based on the feedback. For example, the summarization system 110 may receive feedback (e.g., from a user of the user device 105) about the final summary, and may modify the model based on the feedback. In this way, the summarization system 110 may conserve computing resources, networking resources, and/or other resources that would have otherwise been consumed by generating less accurate summary text due to high dimensionality, generating ambiguous summary text due to high dimensionality, and/or the like.

In some implementations, performing the one or more actions includes the summarization system 110 receiving feedback associated with the final summary and modifying one or more of the first weight, the second weight, or the third weight based on the feedback. For example, the summarization system 110 may receive feedback (e.g., from a user of the user device 105) about the final summary, and may modify one or more of the first weight, the second weight, or the third weight based on the feedback. In this way, the summarization system 110 may conserve computing resources, networking resources, and/or other resources that would have otherwise been consumed by generating less accurate summary text due to high dimensionality, generating ambiguous summary text due to high dimensionality, and/or the like.

In this way, the summarization system 110 reduces input to and increases processing speeds of NLP models. For example, the summarization system 110 may generate a text summary that combines sentiment, domain knowledge associated with entities, word frequency, and an abstract summary associated with the text. The summarization system 110 may examine the text, based on the sentiment, the domain knowledge, the word frequency, and the abstract summary associated with the text, to capture knowledge of the text in a reduced (e.g., a summarized) form. The summarization system 110 may identify and retain sentences of the text associated with strong sentiment aspects, and may retain sentences of the text that include the domain knowledge. The summarization system 110 may generate the abstract summary in order to identify an objective of the text. Thus, the summarization system 110 may conserve computing resources, networking resources, and/or other resources that would have otherwise been consumed by handling computational overload due to high dimensionality, generating less accurate summary text due to high dimensionality, generating ambiguous summary text due to high dimensionality, increasing carbon emissions due to high dimensionality, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
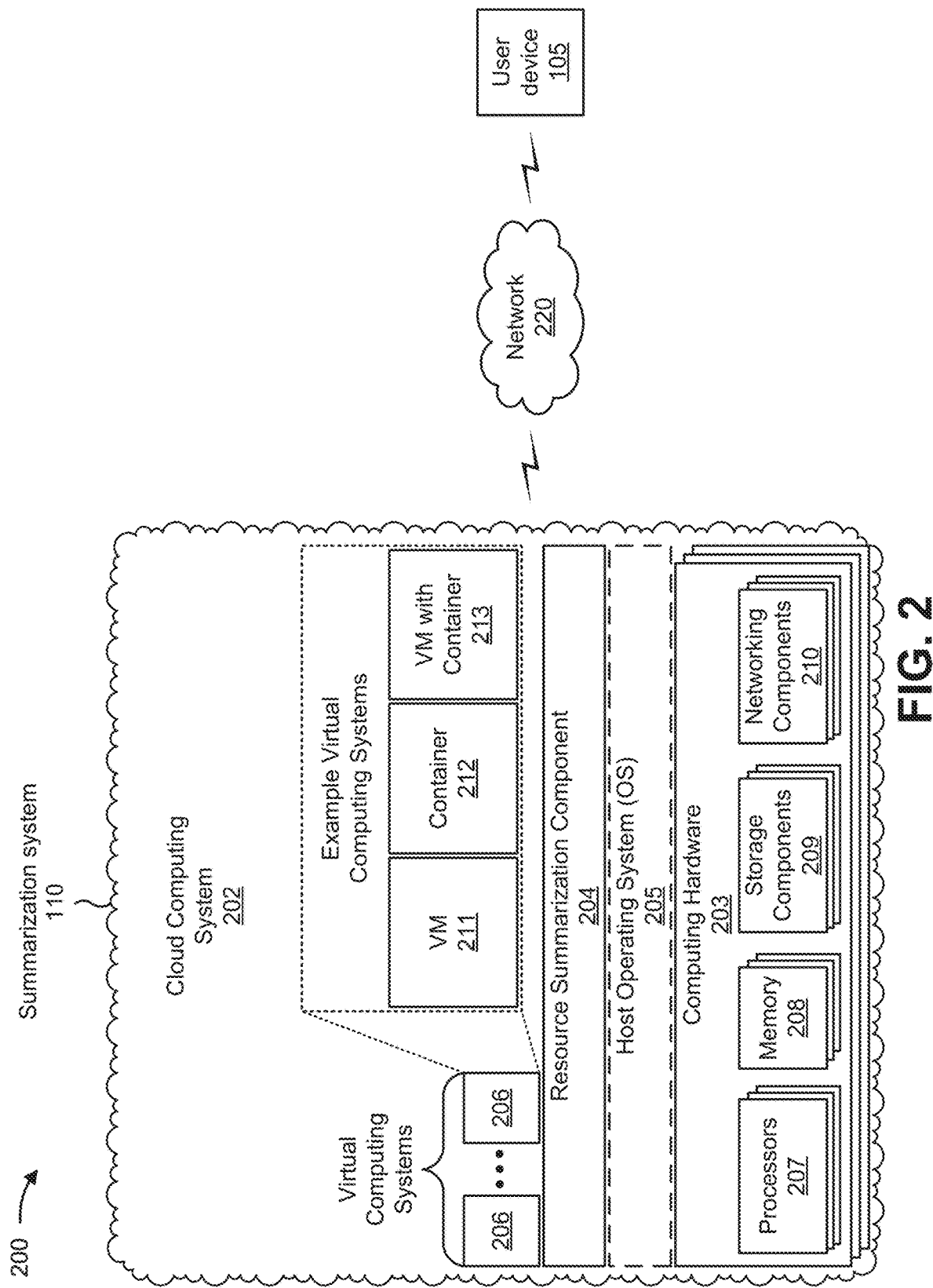
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the summarization system 110, which may include one or more elements of and/or may execute within a cloud computing system 202. The cloud computing system 202 may include one or more elements 203-213, as described in more detail below. As further shown in FIG. 2, the environment 200 may include the user device 105 and/or a network 220. Devices and/or elements of the environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the summarization system 110 may include one or more elements 203-213 of the cloud computing system 202, may execute within the cloud computing system 202, and/or may be hosted within the cloud computing system 202, in some implementations, the summarization system 110 may not be cloud-based (e.g., may be implemented outside of a cloud computing system) or may be partially cloud-based. For example, the summarization system 110 may include one or more devices that are not part of the cloud computing system 202, such as the device 300 of FIG. 3, which may include a standalone server or another type of computing device. The summarization system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
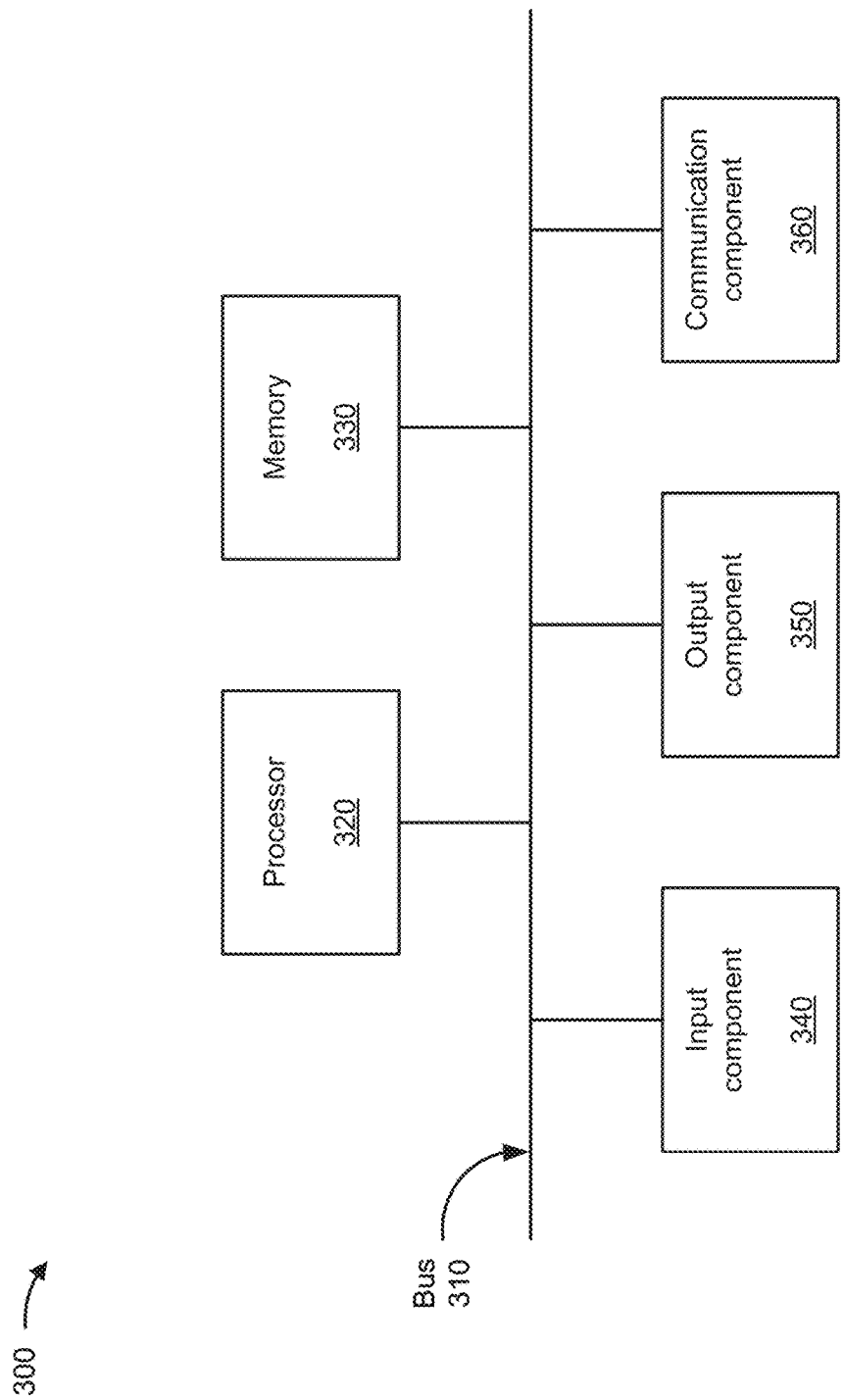
FIG. 3 is a diagram of example components of one or more devices of FIG. 2.

FIG. 3 is a diagram of example components of a device 300, which may correspond to the user device 105 and/or the summarization system 110. In some implementations, the user device 105 and/or the summarization system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4A:
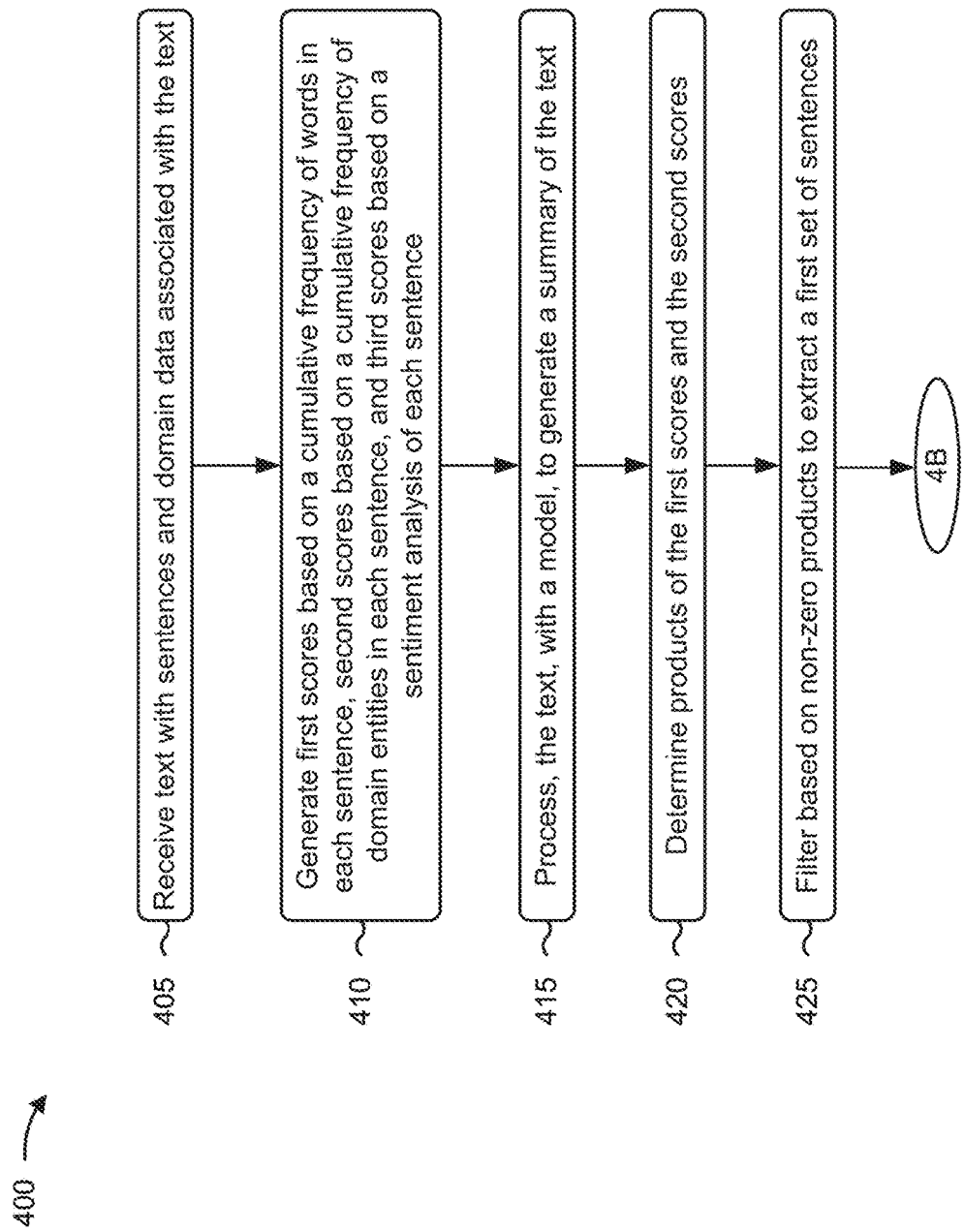
FIGS. 4A-4C depict a flowchart of an example process for reducing input to and increasing processing speeds of NLP models.
Figure 4B:
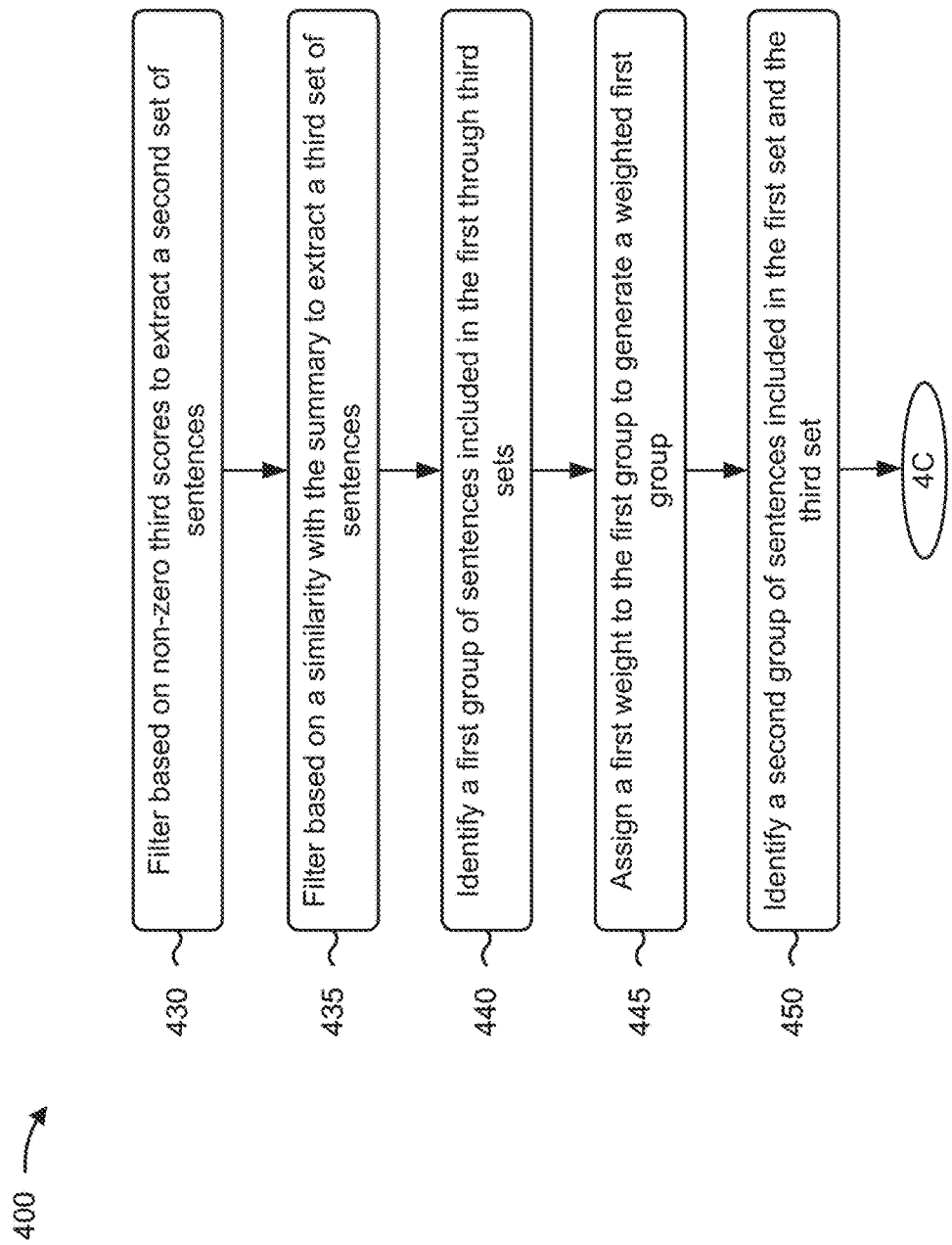
Figure 4C:
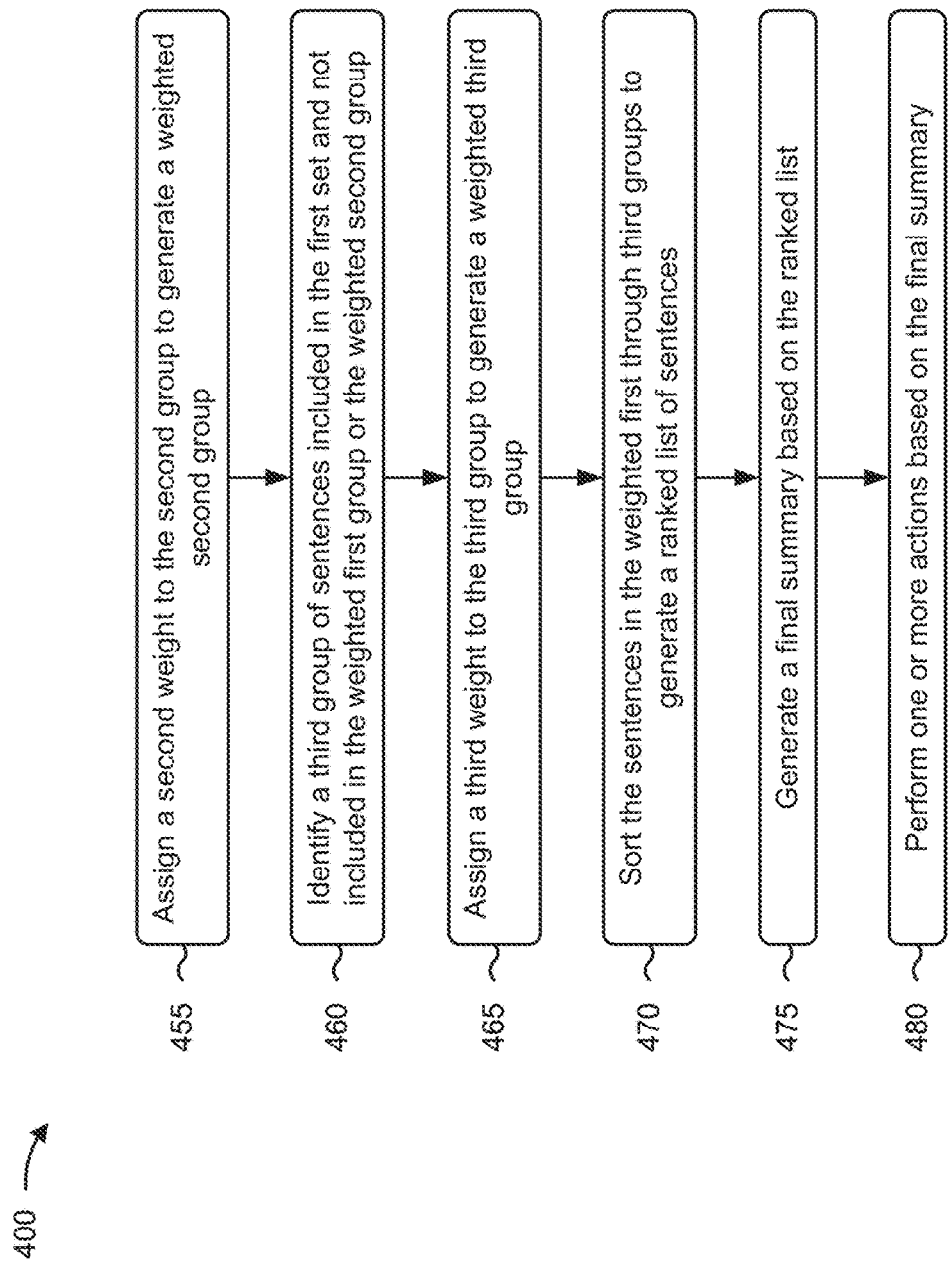

FIGS. 4A-4C depict a flowchart of an example process 400 for reducing input to and increasing processing speeds of NLP models. In some implementations, one or more process blocks of FIGS. 4A-4C may be performed by a device (e.g., the summarization system 110). In some implementations, one or more process blocks of FIGS. 4A-4C may be performed by another device or a group of devices separate from or including the device, such as a user device (e.g., the user device 105). Additionally, or alternatively, one or more process blocks of FIGS. 4A-4C may be performed by one or more components of the device 300, such as the processor 320, the memory 330, the input component 340, the output component 350, and/or the communication component 360.

As shown in FIG. 4A, process 400 may include receiving text with sentences and domain data associated with the text (block 405). For example, the device may receive text with sentences and domain data associated with the text, as described above.

As further shown in FIG. 4A, process 400 may include generating first scores based on a cumulative frequency of words in each sentence, second scores based on a cumulative frequency of domain entities in the domain data and in each sentence, and third scores based on a sentiment analysis of each sentence (block 410). For example, the device may generate first scores for the sentences based on a cumulative frequency of words in each sentence, may generate second scores for the sentences based on a cumulative frequency of domain entities in the domain data and in each sentence, and may generate third scores for the sentences based on a sentiment analysis of each sentence, as described above. In some implementations, generating the first scores for the sentences based on the cumulative frequency of the words in each sentence includes normalizing the cumulative frequency of the words in each sentence to generate the first scores for the sentences. In some implementations, generating the second scores for the sentences based on the cumulative frequency of the domain entities in the domain data and in each sentence includes normalizing the cumulative frequency of the domain entities in the domain data and in each sentence to generate the second scores for the sentences. In some implementations, generating the third scores for the sentences based on the sentiment analysis of each sentence includes extracting phrases from the sentences, determining sentiments associated with the phrases, and generating the third scores for the sentences based on the sentiments associated with the phrases.

As further shown in FIG. 4A, process 400 may include processing the text, with a model, to generate a summary of the text (block 415). For example, the device may process the text, with a model, to generate a summary of the text, as described above. In some implementations, the model is an encoder-decoder model. In some implementations, the summary of the text includes one or more words not included in the text.

As further shown in FIG. 4A, process 400 may include determining products of the first scores and the second scores (block 420). For example, the device may determine products of the first scores and the second scores, as described above.

As further shown in FIG. 4A, process 400 may include filtering based on non-zero products and to extract a first set of sentences (block 425). For example, the device may filter the sentences based on non-zero products and to extract a first set of sentences, as described above.

As shown in FIG. 4B, process 400 may include filtering based on non-zero third scores and to extract a second set of sentences (block 430). For example, the device may filter the sentences based on non-zero third scores and to extract a second set of sentences, as described above.

As further shown in FIG. 4B, process 400 may include filtering based on a similarity with the summary and to extract a third set of sentences (block 435). For example, the device may filter the sentences based on a similarity with the summary and to extract a third set of sentences, as described above.

As further shown in FIG. 4B, process 400 may include identifying a first group of sentences included in the first through third sets (block 440). For example, the device may identify a first group of sentences included in the first set, the second set, and the third set, as described above.

As further shown in FIG. 4B, process 400 may include assigning a first weight to the first group to generate a weighted first group (block 445). For example, the device may assign a first weight to the first group to generate a weighted first group, as described above.

As further shown in FIG. 4B, process 400 may include identifying a second group of sentences included in the first set and the third set (block 450). For example, the device may identify a second group of sentences included in the first set and the third set, as described above.

As shown in FIG. 4C, process 400 may include assigning a second weight to the second group to generate a weighted second group (block 455). For example, the device may assign a second weight to the second group to generate a weighted second group, as described above.

As further shown in FIG. 4C, process 400 may include identifying a third group of sentences included in the first set and not included in the weighted first group or the weighted second group (block 460). For example, the device may identify a third group of sentences included in the first set and not included in the weighted first group or the weighted second group, as described above.

As further shown in FIG. 4C, process 400 may include assigning a third weight to the third group to generate a weighted third group (block 465). For example, the device may assign a third weight to the third group to generate a weighted third group, as described above. In some implementations, the first weight is greater than the second weight, and the second weight is greater than the third weight.

As further shown in FIG. 4C, process 400 may include sorting the sentences in the weighted first through third groups to generate a ranked list of sentences (block 470). For example, the device may sort the sentences in the weighted first group, the weighted second group, and the weighted third group to generate a ranked list of sentences, as described above.

As further shown in FIG. 4C, process 400 may include generating a final summary based on the ranked list (block 475). For example, the device may generate a final summary based on the ranked list, as described above. In some implementations, the text is a transcript of a bot call and the final summary provides a summary of the transcript.

As further shown in FIG. 4C, process 400 may include performing one or more actions based on the final summary (block 480). For example, the device may perform one or more actions based on the final summary, as described above. In some implementations, performing the one or more actions includes one or more of providing the final summary for display, modifying one or more of the first weight, the second weight, or the third weight based on the final summary, or modifying the model based on the final summary. In some implementations, performing the one or more actions includes receiving feedback associated with the final summary, and modifying the model based on the feedback. In some implementations, performing the one or more actions includes receiving feedback associated with the final summary, and modifying one or more of the first weight, the second weight, or the third weight based on the feedback.

In some implementations, process 400 includes preprocessing and tokenizing the text to identify the sentences in the text.

In some implementations, process 400 includes receiving information identifying a maximum quantity of sentences to be included in the final summary, wherein the final summary includes less than or equal to the maximum quantity of sentences.

Although FIGS. 4A-4C show example blocks of process 400, in some implementations, process 400 may include additional blocks, fewer blocks, different blocks, or differently arranged blocks than those depicted in FIGS. 4A-4C. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   generating, by a device, first scores for sets of words based on a frequency of words related to each set of words, second scores for the sets of words based on a frequency of domain entities related to each set of words, and third scores for the sets of words based on a sentiment analysis related to each set of words;
   processing, by the device, the sets of words to generate a summary associated with the sets of words;
   filtering, by the device, the sets of words based on the first scores, the second scores, the third scores, and a similarity with the summary;
   identifying, by the device and based on the filtering the sets of words, a first group, a second group, and a third group, of sets of words, of the sets of words;
   generating, by the device, another summary based on the sets of words in the first group, the second group, and the third group; and
   performing, by the device, one or more actions based on the other summary.

2. The method of claim 1, further comprising:
   processing the sets of words to identify sentences in the sets of words.

3. The method of claim 1, wherein filtering the sets of words based on the first scores, the second scores, and the third scores comprises:
   filtering the sets of words based on products of the first scores and the second scores.

4. The method of claim 1, wherein generating the other summary based on the sets of words in the first group, the second group, and the third group comprises:
   sorting the sets of words in the first group, the second group, and the third group; and
   generating the other summary based on the sorting.

5. The method of claim 4, wherein sorting the sets of words in the first group, the second group, and the third group comprises:
   assigning weights to the first group, the second group, and the third group; and
   sorting the sets of words in the first group, the second group, and the third group based on the weights.

6. The method of claim 1, wherein the sentiment analysis is based on phrases extracted from the sets of words.

7. The method of claim 1, wherein the other summary includes one or more words not included in the set of words.

8. A device, comprising:
   one or more processors configured to:
      generate first scores for sets of words based on a frequency of words related to each set of words, second scores for the sets of words based on a frequency of domain entities related to each set of words, and third scores for the sets of words based on a sentiment analysis related to each set of words;
      process the sets of words, with a model, to generate a summary associated with the sets of words;
      filter the sets of words based on the first scores, the second scores, the third scores, and a similarity with the summary;
      identify, based on the filtering the sets of words, a first group, a second group, and a third group, of sets of words, of the sets of words;
      generate another summary based on the sets of words in the first group, the second group, and the third group; and
      perform one or more actions based on the other summary.

9. The device of claim 8, wherein the one or more processors are further configured to:
   process the sets of words to identify sentences in the sets of words.

10. The device of claim 8, wherein the one or more processors, to generate the other summary based on the sets of words in the first group, the second group, and the third group, are configured to:
    sort the sets of words in the first group, the second group, and the third group to generate a ranked list; and
    generate the other summary based on the ranked list.

11. The device of claim 8, wherein the one or more processors, to perform the one or more actions, are configured to:
    receive feedback associated with the other summary; and
    modify, based on the feedback, the model.

12. The device of claim 8, wherein the one or more processors, to perform the one or more actions, are configured to:
    modify a weight assigned to the first group, the second group, or the third group.

13. The device of claim 8, wherein the one or more processors are further configured to:
    receive domain data associated with the sets of words; and
    wherein the second scores are further based on a frequency of domain entities in the domain data.

14. The device of claim 8, wherein the summary includes one or more words not included in the sets of words.

15. A non-transitory computer-readable medium storing a set of instructions, the set of instructions comprising:
one or more instructions that, when executed by one or more processors of a device, cause the device to:
generate first scores for sets of words based on a frequency of words related to each set of words, second scores for the sets of words based on a frequency of domain entities related to each set of words, and third scores for the sets of words based on a sentiment analysis related to each set of words;
process the sets of words to generate a summary associated with the sets of words;
filter the sets of words based on the first scores, the second scores, the third scores, and a similarity with the summary;
identify, based on the filtering the sets of words, a first group, a second group, and a third group, of sets of words, of the sets of words;
generate another summary based on the sets of words in the first group, the second group, and the third group; and
perform one or more actions based on the other summary.

16. The non-transitory computer-readable medium of claim 15, wherein the one or more instructions, that cause the device to filter the sets of words based on the first scores, the second scores, cause the device to:
filter the sets of words based on products of the first scores and the second scores.

17. The non-transitory computer-readable medium of claim 15, wherein the one or more instructions, that cause the device to generate the other summary based on the sets of words in the first group, the second group, and the third group, cause the device to:
sort the sets of words in the first group, the second group, and the third group; and
generate the other summary based on the sorting.

18. The non-transitory computer-readable medium of claim 15, wherein the other summary includes less than or equal to a maximum quantity of sets of words to be included in the other summary.

19. The non-transitory computer-readable medium of claim 15, wherein the sets of words are sentences.

20. The non-transitory computer-readable medium of claim 15, wherein the summary includes one or more words not included in the sets of words.

* * * * *